United States Patent
Miyajima et al.

(10) Patent No.: US 6,805,423 B2
(45) Date of Patent: Oct. 19, 2004

(54) SYSTEM AND METHOD FOR CONTROLLING GRADATION

(75) Inventors: Takeo Miyajima, Kanagawa (JP); Kei Suzuki, Kanagawa (JP); Mitsuhiro Igarashi, Kanagawa (JP); Masami Kawamori, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 10/413,398

(22) Filed: Apr. 15, 2003

(65) Prior Publication Data

US 2004/0169698 A1 Sep. 2, 2004

(30) Foreign Application Priority Data

Feb. 27, 2003 (JP) .......................... 2003-051160

(51) Int. Cl.$^7$ .............................. B41J 2/205; G03F 3/08; G01D 15/16
(52) U.S. Cl. .......................... 347/15; 358/521; 347/183
(58) Field of Search ........................... 347/15, 43, 183, 347/10; 358/1.2, 1.9, 521, 261.3, 429; 382/164, 176, 166

(56) References Cited

U.S. PATENT DOCUMENTS 5,909,505 A * 6/1999 Katayama et al. .......... 382/164
5,936,644 A * 8/1999 Ono et al. .................... 347/10

FOREIGN PATENT DOCUMENTS

JP 04-220358 A 8/1992
JP 11-115234 A 4/1999

* cited by examiner

Primary Examiner—Lamson Nguyen
(74) Attorney, Agent, or Firm—Sughrue Mion, PLLC

(57) ABSTRACT

A gradation control system includes a device for deriving 2n decoded data from lower n bits expressing a gradation per dot, a device for grouping the 2n decoded data with respect to a plurality of dots, to produce 2**n first bit planes, a device for giving to an element a signal of pattern corresponding to each of the first bit planes for a time obtained by adding a time that depends on a decoded value of each of the first bit planes, to an initializing time, a device for grouping, per bit weight, respective bits excluding the lower n bits that express the gradation per dot, to produce a second bit plane, and a device for giving to the element a signal of pattern corresponding to the second bit plane for a time that depends on a weight of the second bit plane.

18 Claims, 9 Drawing Sheets

SYSTEM AND METHOD FOR CONTROLLING GRADATION

BACKGROUND OF THE INVENTION

1. Field of the Invention

The present invention relates to a gradation control system and a gradation control method for controlling printing or the like with a plurality of gradations and, in particular, relates to a gradation control system and a gradation control method for use in a thermal printer or the like.

2. Description of the Related Art

In recent years, for example, receipts issued by small thermal printers connected to POS (Point Of Sales) terminals etc. often include indication of messages etc. about advertisement of commodities and sales promotion, in addition to list of particulars about usual sales registration results. Accordingly, there has been a tendency that when printing the receipts, two-color printing using two-color thermosensitive paper or multi-color printing using the inkjet printing technique is carried out, i.e. the power of expression is required to the receipts themselves. On the other hand, there has been a problem that customers' requirements about running cost, such as cost of the two-color paper as compared with general thermosensitive paper and cost of inks, are severe so that the spread of two-colored or multi-colored receipts is not liable to be advanced.

Incidentally, as prior art literature relating to the present invention, there have been the following:

(1) JP-A-H11-115234

(2) JP-A-H04-220358

Therefore, by realizing multi-gradation printing using thermal printers that utilize the conventional general thermosensitive paper, it has been implemented to give the power of expression to receipts in the manner of, for example, advertisement of commodities with photographs or stamp printing.

Conventionally, in a thermal printer that performs a multiple gradation printing by superimposing heat energy per dot to utilize a coloring characteristic of thermosensitive paper, it is necessary to apply the same dot a number of times according to a gradation degree as shown, for example, in FIG. 3 of the patent document (1). In case of, for example, printing n-gradation data, heat energy is superimposed by repeatedly carrying out an applying operation n−1 times at maximum. In this case, there is a problem that as the number of gradations increases, the number of times of transfer to a thermal head also increases. More specifically, since a time required for performing an applying operation with respect to one dot line is prolonged in proportion to the number of gradations, an operation of conveying a paper to the next line is kept waiting. That is, there has been a problem that as the number of gradations increases, the printing speed is obliged to be decreased.

On the other hand, as described in the patent document (2), there is a method that transfers a binary gradation value expression as it is to a thermal head as energization data and gives a bit weight to an energizing time itself. In this method, as opposed to the foregoing method, when performing the n-gradation application, it is sufficient to perform transfer to the thermal head by the number of bits that express it. However, there is a problem that because of physical restriction of a time for transferring data to the thermal head, a difference in energizing time per one gradation is restricted by the time for transferring data. More specifically, when explanation is given using a time chart of the conventional method shown in FIG. 8, assuming that a time required for serial transfer of data to the thermal head is, for example, 32 μsec, an interval from latching of certain data to latching of the next data is required to be 32 μsec or more. It means that, referring to FIG. 8, while latching data PT0, it is necessary to transfer the next data PT1, and thus, if a time for this data transfer is 32 μsec, a time from latching of PT0 to latching of PT1 is required to be 32 μsec or longer. Namely, this means that an energizing time for the data PT0 is required to be at least 32 μsec in this case, and this problem is actualized particularly in the following case. FIG. 2 shows a heat energy vs. coloring concentration characteristic of general thermosensitive paper. Setting of the minimum gradation difference is restricted due to, for example, the following reason, so that, as shown in FIG. 2, if a gradation control is executed with a time T8 per gradation difference, a coloring concentration difference per gradation becomes large in a half-tone coloring region that is the most important and thus should be fractionized when carrying out the gradation printing. Therefore, there has been a problem that these concentration differences work as one factor that impedes the smooth gradation printing.

Needless to say, a similar problem exists in the patent document 1.

SUMMARY OF THE INVENTION

Therefore, it is an object of the present invention to solve such a conventional problem, and provide a gradation control system and method that can determine a target minimum energizing time and minimum gradation difference value without depending on a physical transfer time of a thermal head.

According to a first aspect of the present invention, there is provided a gradation control system comprising means for decoding lower n bits (n is an integer equal to 1 or greater than 1) of a binary number expressing a gradation per dot, to derive $2^n$ decoded data; means for grouping the $2^n$ decoded data with respect to a plurality of dots, to produce $2^n$ first bit planes; means for giving to an element a signal of pattern corresponding to each of the first bit planes for a time obtained by adding a time that depends on a decoded value of each of the first bit planes, to an initializing time common to all of the first bit planes; means for grouping, per bit weight, respective bits of the binary number excluding the lower n bits, that expresses the gradation per dot, to produce at least one second bit plane; and means for giving to the element a signal of pattern corresponding to each second bit plane for a time that depends on a weight of the second bit plane.

According to a second aspect of the present invention, there is provided a gradation control system comprising means for decoding lower n bits (n is an integer equal to 1 or greater than 1) of a binary number expressing a gradation per dot, to derive $2^n$ decoded data; means for grouping the $2^n$ decoded data with respect to a plurality of dots, to produce $2^n$ first bit planes; means for giving to an element a signal of pattern corresponding to each of the first bit planes for a time obtained by subtracting an unconditional time common to all of the first bit planes from a time obtained by adding a time that depends on a decoded value of each of the first bit planes, to an initializing time common to all of the first bit planes; means for giving to the element a signal of all bit effective pattern for the unconditional time; means for grouping, per bit weight, respective bits of the binary number excluding the lower n bits, that expresses the gradation per dot, to produce at least one second bit plane; and means for giving to the element a signal of pattern corresponding to each second bit plane for a time that depends on a weight of the second bit plane.

In the gradation control system according to the first or second aspect of the present invention, it is preferable that the initializing time is a time for causing a recording medium to reach a coloring region.

In the gradation control system according to the first or second aspect of the present invention, it is preferable that the initializing time is longer than a transfer time for each bit plane.

The gradation control system according to the first or second aspect of the present invention may further comprise means for giving to the element a signal corresponding to a history of use of each dot.

According to a third aspect of the present invention, there is provided a thermal printer comprising the gradation control system according to the first or second aspect of the present invention.

A first effect of the present invention resides in that, by fractionizing an energizing time with respect to a region where a concentration variation is the largest in a coloring characteristic of thermosensitive paper, so as to precisely control color development of a half-tone portion, smoother gradation printing can be realized.

The reason thereof is that, by adding an initial energizing time necessary for thermosensitive paper to start color development, to the minimum value of an energizing time so as to execute a control, the minimum energizing time that determines the minimum gradation difference is not restricted by, for example, a physical transfer time that is inevitably generated upon carrying out serial data transfer to a thermal head.

A second effect of the present invention resides in that a gradation control can flexibly deal with a coloring characteristic that changes depending on a kind of thermosensitive paper, a thermal head to be used, or an outside air temperature.

The reason thereof is that the factor that restricts the minimum gradation difference is eliminated as referred to in the reason of the first effect, and that since a value of binary data is checked to enable a gradation difference to be determined by software, variation of the coloring characteristic can be flexibly dealt with.

DESCRIPTION OF THE PREFERRED EMBODIMENT

Now, the best modes of the present invention will be described in detail hereinbelow with reference to the accompanying drawings. Although description will be given hereinbelow about a gradation control system and method of a thermal printer, an application of a gradation control system and method of the present invention are not limited to the thermal printer.

[Embodiment 1]

The first embodiment of the present invention will be first described.

A gradation control system of a thermal printer and a gradation control method of a thermal head according to the first embodiment are characterized by, with respect to the thermal printer and the thermal head that implement concentration gradation, executing an energization control that can achieve a target gradation difference with no necessity of considering a physical transfer time to the thermal head by estimating beforehand a gradation value expressed in binary notation and properly changing part of an energizing time which has been weighted per bit.

Figure 1:
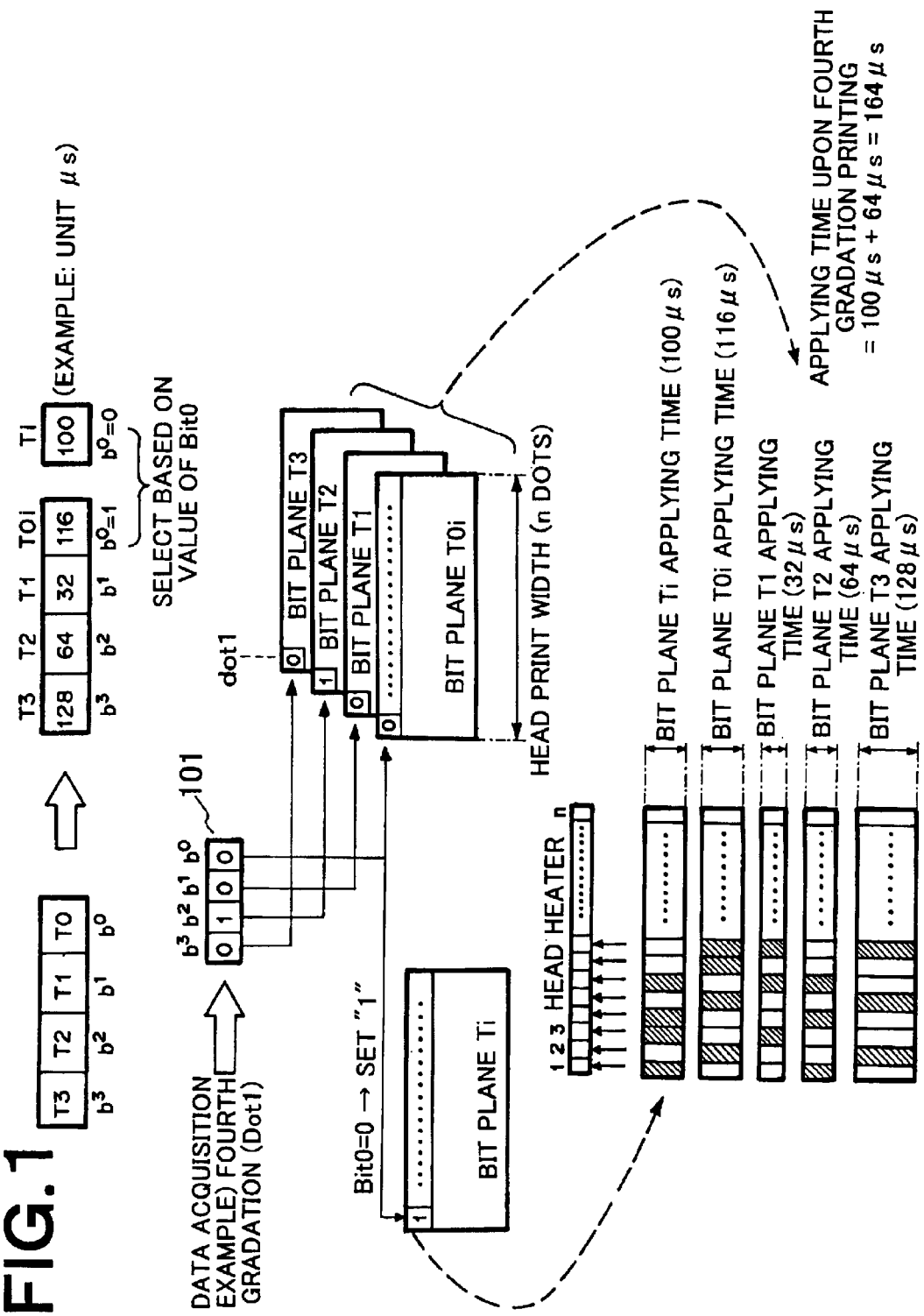
FIG. 1 is a conceptual diagram for explaining a gradation control system according to a first preferred embodiment of the present invention.

In FIG. 1, when, for example, 16-gradation binary data expressed by 4 bits is acquired, the gradation binary data is decomposed into bit planes T3, T2, T1 and T0$i$ on a RAM as energization data. In this event, a value of bit 0 of the binary data is checked and, if the checked value is "0", "1" is set to bit plane Ti that is additionally provided, while, if the checked value is "1", "0" is set to bit plane Ti, thereby performing selection of an effective bit plane. After carrying out this operation with respect to all the dots in one dot line, bit planes Ti, T0$i$, T1, T2 and T3 are transferred to the thermal head in this order, thereby performing an applying operation. An energizing time for each bit plane depends on a corresponding bit weight of the binary data, and is given by "(a power of 2) multiplied by (a minimum gradation difference)". In this embodiment, the minimum gradation difference is set to 16 $\mu$sec and the data is a 4-bit binary number. Therefore, bit plane T3 becomes 128 $\mu$sec, bit plane T2 becomes 64 $\mu$sec, and bit plane Ti becomes 32 $\mu$sec. Here, bit plane T0$i$ is not set to 16 $\mu$sec representing the minimum gradation difference, but is set to a value added with an initial energizing time Ti in advance. In this embodiment, the initial energizing time Ti is set to 100 $\mu$sec, and thus, bit plane T0$i$ is set to 116 $\mu$sec (=100 $\mu$sec+16 $\mu$sec). On the other hand, energization is also carried out for bit plane Ti, and this energizing time is set to 100 $\mu$sec. In this state, the value of bit 0 is checked as described above in order to determine each bit in bit plane T0$i$ and each bit in bit plane Ti, whereby a gradation control with the minimum gradation difference 16 $\mu$sec (=116 $\mu$sec 100 $\mu$sec) is made possible irrespective of a physical transfer time to the thermal head even if this physical transfer time takes any value.

Figure 3:
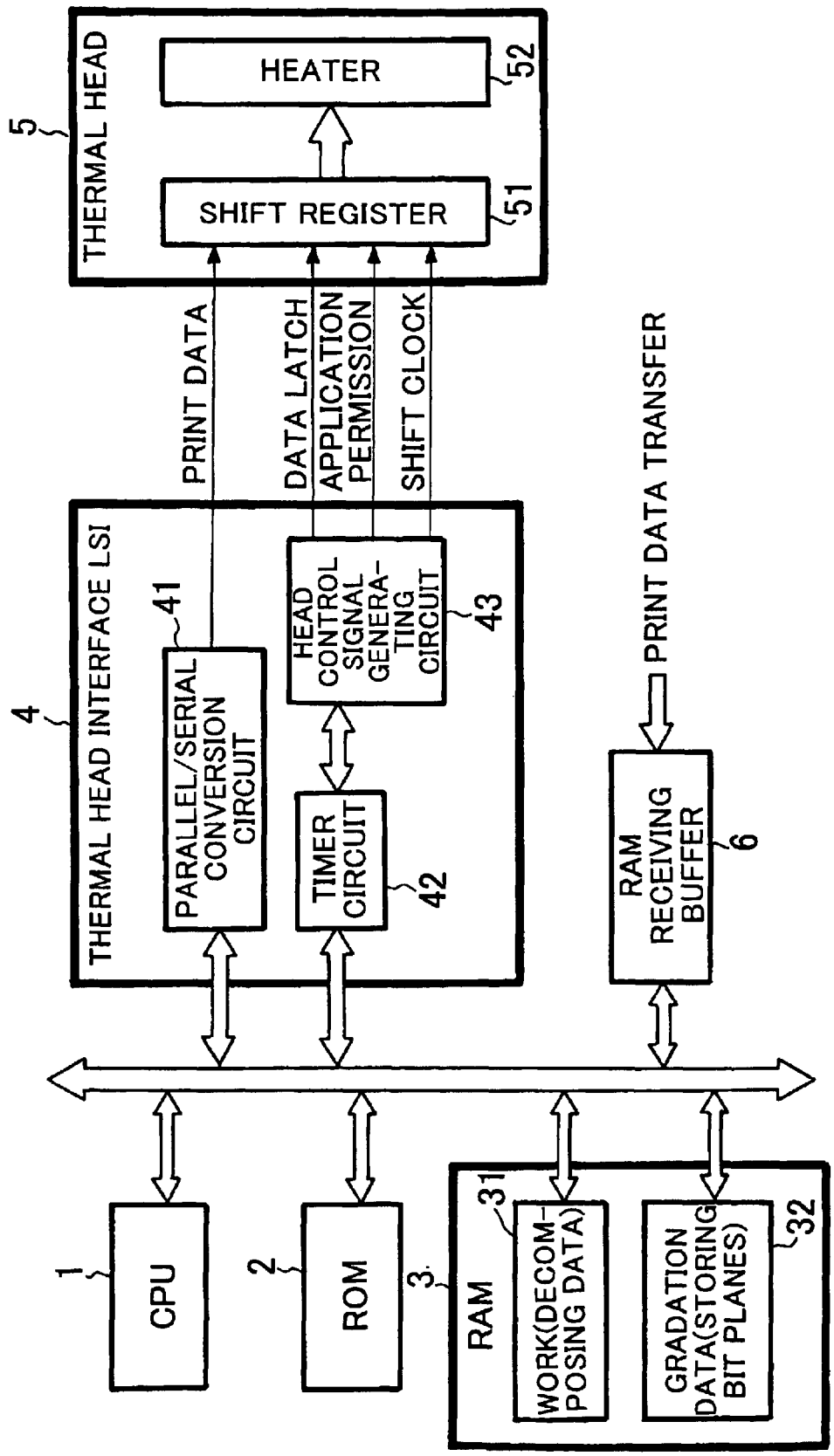
FIG. 3 is a block diagram showing a structure of a thermal printer including the gradation control system according to the first embodiment of the present invention.

Now, a structure of the first embodiment will be described. FIG. 3 is a block diagram of the first embodiment of the present invention. A CPU 1 implements an operation of decomposing received binary data into respective bit planes as represented by reference 101 in FIG. 1 according to programs stored in a ROM 2, and simultaneously, checking a gradation value thereof and properly changing an energizing time weighted per bit thereof.

Further, upon completion of the bit-plane decomposing process, the CPU 1 transfers the respective bit planes to a parallel/serial conversion circuit 41 provided in a thermal head interface LSI 4. The ROM 2 stores therein programs for realizing a method of decomposing bits of binary data into respective bit planes, and a method of checking a value thereof to select an effective bit plane, and timer values of energizing times weighted to the respective bits. A RAM 3 is provided with a work area 32 that stores gradation data after the decomposition into the respective bit planes and work area 31 for the CPU 1 to execute the bit-plane decomposing process and the selection process. A receiving buffer 6 temporarily stores original binary data received from a host computer or means that implement conversion into a binary number from another image format. In the first embodiment, data in a binary format is directly received for convenience' sake, but it may also be arranged that data in another image format is directly received, the CPU 1 performs a process to convert it into a binary format, and subsequent processes are carried out. The thermal head interface LSI 4 is a circuit for directly controlling a thermal head 5. The parallel/serial conversion circuit 41 is a circuit for converting, for example, parallel data on a data bus into serial data. A timer circuit 42 counts an energizing time, as a set value, that is weighted for each bit of n-bit gradation data expressed in binary notation and gives that timing to a head control signal generating circuit 43 in a subsequent stage. The head control signal generating circuit 43 executes a timing control for the thermal head 5 in accordance with the applying timing produced by the timer circuit 42. The thermal head 5 is a mechanism portion that gives heat energy to thermosensitive paper by means of a heater 52, thereby causing color development of the thermosensitive paper.

Figure 9:
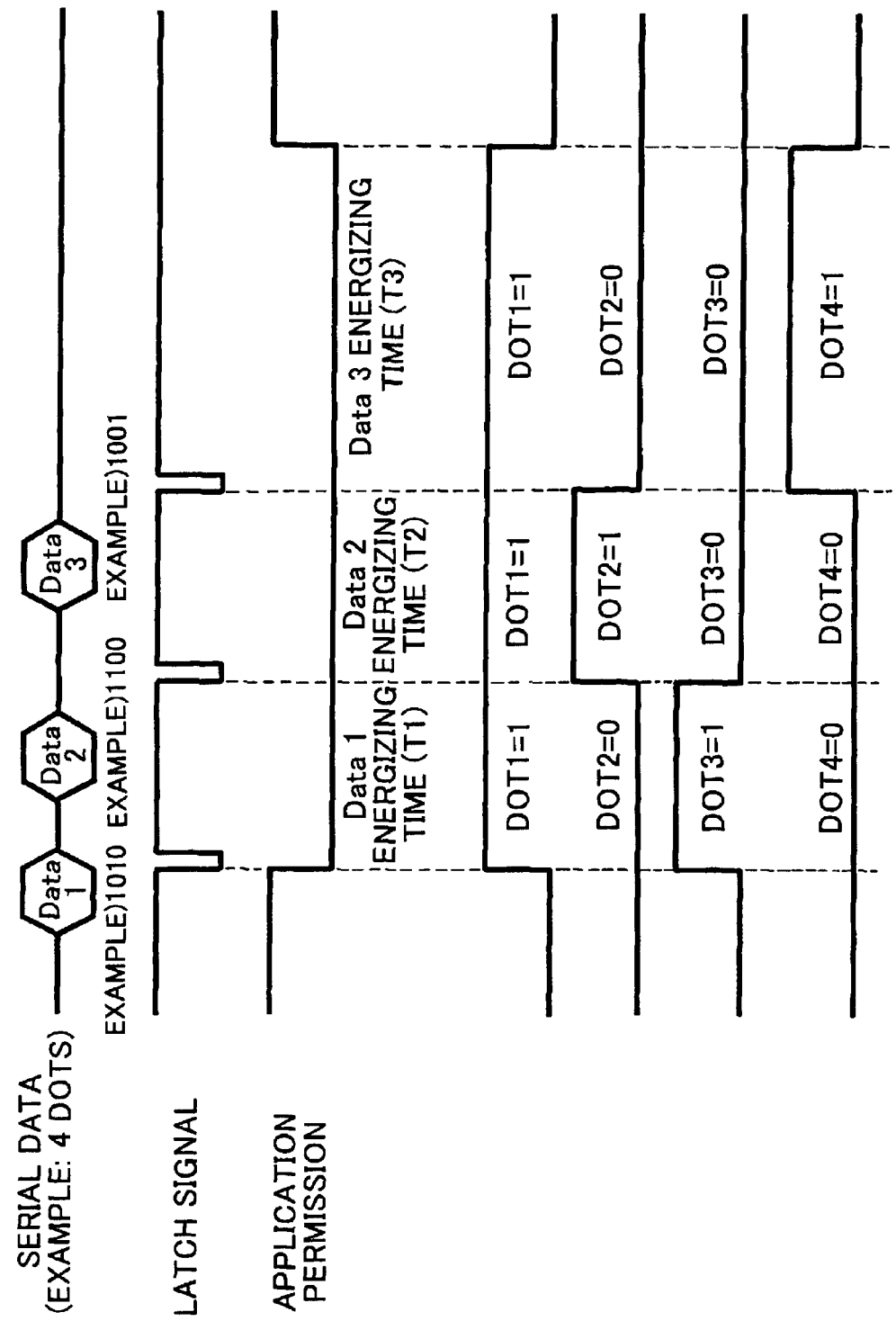
FIG. 9 is a second timing chart for explaining an operation of a conventional gradation control system.

A shift register 51 has a bit length corresponding to the number of heating elements of the heater 52. The shift register 51 shifts binary print data serially which has been converted by the parallel/serial conversion circuit 41, using shift clocks produced by the head control signal producing circuit 43 in sequence, then latches the data in parallel relative to all the heating elements of the heater 52 using a data latch signal that is also produced by the head control signal generating circuit 43. In this event, for example, data corresponding to an energizing dot is set to "1", while data corresponding to a non-energizing dot is set to "0", which has a function of turning on or off driving circuits connected to the respective heating elements inside the heater 52. FIG. 9 shows the general thermal head control timing. The present invention is realized by modifying the control timing as shown in FIG. 9.

The thermal head interface LSI 4 is in the form of an LSI for convenience' sake, but it may also be realized by a circuit having similar constituent elements on the exterior.

Now, an operation of the first embodiment of the present invention will be described referring to the figures. FIG. 1 is a diagram showing an operation of the present invention and is a conceptual diagram upon printing the fourth gradation of the whole 16 gradations as an example.

It is assumed now that binary data representing the fourth gradation is received to print the first dot from an end of the thermal head. First, the CPU 1 in FIG. 3 reads out the received data from the receiving buffer 6, and decomposes the acquired 4-bit data per bit as shown in FIG. 1. Specifically, a value of bit 3 is given to bit plane T3, a value of bit 2 to bit plane T2, a value of bit 1 to bit plane T1, and a value of bit 0 to bit plane T0$i$. Here, each bit plane is a two-dimensional region having a bit length corresponding to the number of the heating elements of the thermal head 5, and a size corresponding to a certain number of print lines, and one bit plane is assigned to each of bits that are necessary to express the gradation as described above. In the first embodiment, inasmuch as the number of gradations is expressed by 4 bits, there exist at least four bit planes and, because it is assumed that the first dot is to be printed, the values are set, as they are, in positions corresponding to the first dot of the respective bit planes. Further, while decomposing the binary data into the respective bit planes, a value of bit 0 is checked. If the checked value is "0", "1" is set in a position corresponding to the first dot of bit plane Ti being another bit plane. To the contrary, if the checked value is "1", "0" is set in the corresponding position of bit plane Ti. This operation is carried out with respect to print data corresponding to all the dots of the heater 52, and obtained data is stored in the gradation data storing area 32 of the RAM 3, which is repeated for subsequent print lines. Then, when certain print data is stored in this manner, the stored gradation data is transferred to the parallel/serial conversion circuit 41 per dot line in order of the bit planes. When this transfer is started, the head control signal generating circuit 43 outputs a shift clock signal to the shift register 51 of the thermal head 5 synchronously with the transfer, thereby shifting the data in sequence. When the data shift is finished for one dot line, i.e. correspondingly to the number of the heating elements of the heater 52, the head control signal generating circuit 43 outputs a data latch signal for driving the heating elements. Simultaneously, an application permission signal is made effective so that energization of the heating elements is actually started. Further, simultaneously, transfer of the next bit plane is started so as to start a shift-in operation in the same manner. In this event, the application permission signal is held effective until transfer of all the bit planes is completed. Since transfer data is, for example, set to "1" in case of an energizing dot and set to "0" in case of a non-energizing dot, an energizing or non-energizing time of the transfer data corresponds to a time for which each bit plane latches the data. Therefore, if the timing of outputting the latch signal is set in the timer circuit 42 per transfer of each bit plane, an energizing time for each bit plane can be controlled. The present invention is realized using this technique.

Figure 2:
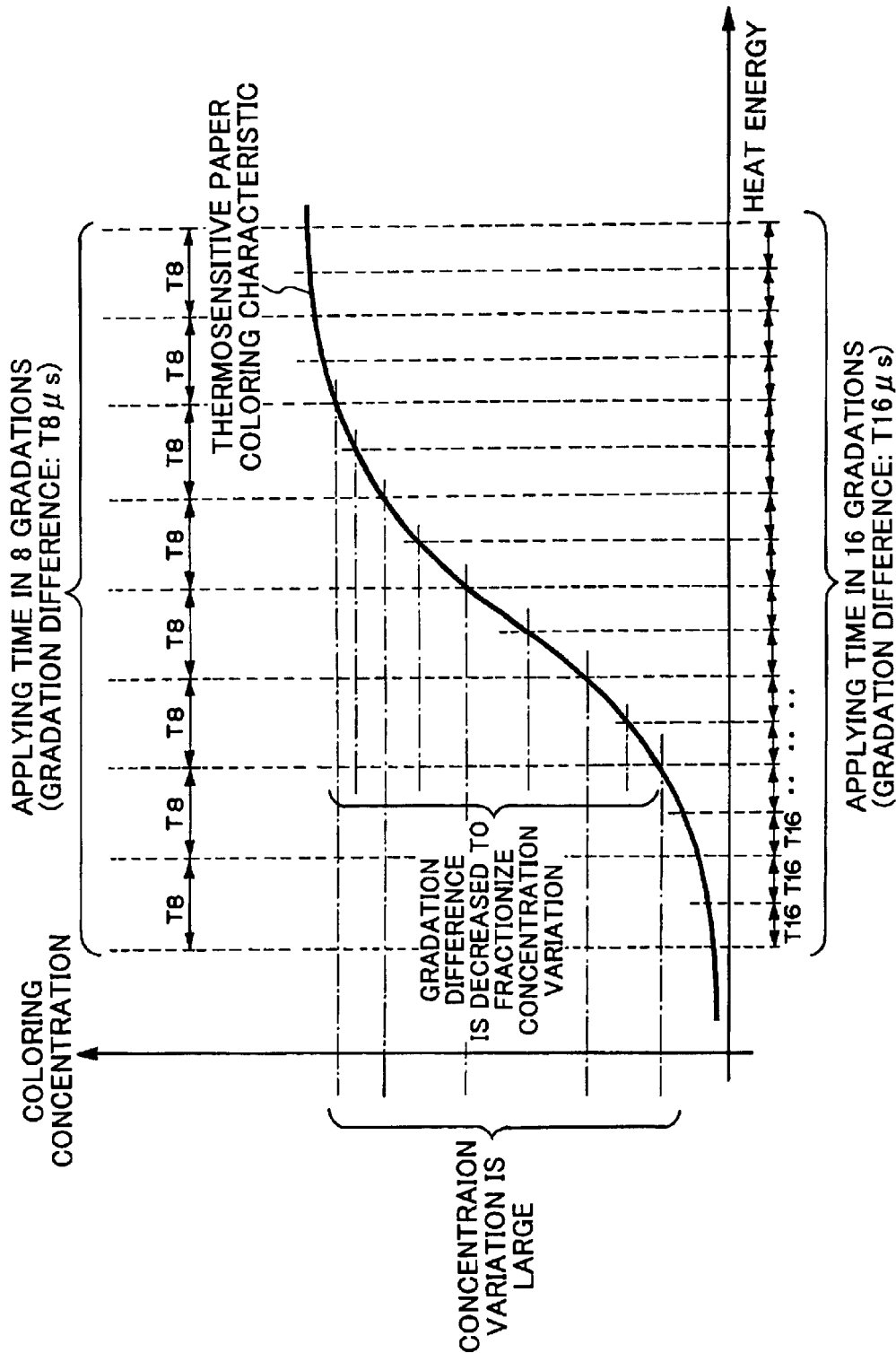
FIG. 2 is a graph showing a heat energy vs. coloring concentration characteristic in a thermal printer.

The energizing time is determined based on a minimum time of gradation difference and a weight of each bit of binary data, and derived by "(a power of 2) multiplied by (a minimum gradation difference)". For example, in the first embodiment, since it is assumed that the minimum gradation difference is set to 16 $\mu$sec and the data is 4-bit binary data, an energizing time corresponding to bit 3, i.e. bit plane T3, becomes $2^3 \times 16$ $\mu$sec=128 $\mu$sec, an energizing time for bit plane T2 becomes $2^2 \times 16$ $\mu$sec=64 $\mu$sec, and an energizing time for bit plane T1 becomes $2^1 \times 16$ $\mu$sec=32 $\mu$sec. Here, bit plane T0$i$ is not set to $2^0 \times 16$ $\mu$sec. FIG. 2 shows a coloring characteristic curve of thermosensitive paper. As shown in FIG. 2, the general thermosensitive paper has a tendency of hardly causing color development until an applied heat energy exceeds a certain amount. On the other hand, if the heat energy continues to be applied thereafter, the coloring concentration rises rapidly, and further application of the heat energy causes saturation of the concentration. From this characteristic, only a gradation difference from the 0th gradation where no printing is carried out, to the first gradation is needed to be large. Accordingly, an energizing time until the heat energy amount reaches the certain amount is inevitably necessary, apart from an energization control for carrying out a gradation control. In the present invention, a value obtained by adding an initial energizing time corresponding to such an energizing time to the minimum energizing time is set as a value of the first gradation. Specifically, in the first embodiment, bit plane T0$i$ is set to 116 μsec that is obtained by adding the initial energizing time Ti=100 μsec to the minimum gradation difference of 16 μsec. Here, the initial energizing time Ti is provided as bit plane Ti, i.e. as a bit plane having an exclusive relationship to bit plane T0$i$, as described before. An energizing time for bit plane Ti is set to 100 μsec that is equal to the initial energizing time Ti. In the first embodiment having the foregoing structure, by exclusively switching values set to bit plane T0$i$ and values se to bit plane Ti based on a value of bit 0 of the received binary data as described before, it is possible to control which one of the energizing times weighted to bit 0 should be made effective.

Figure 4:
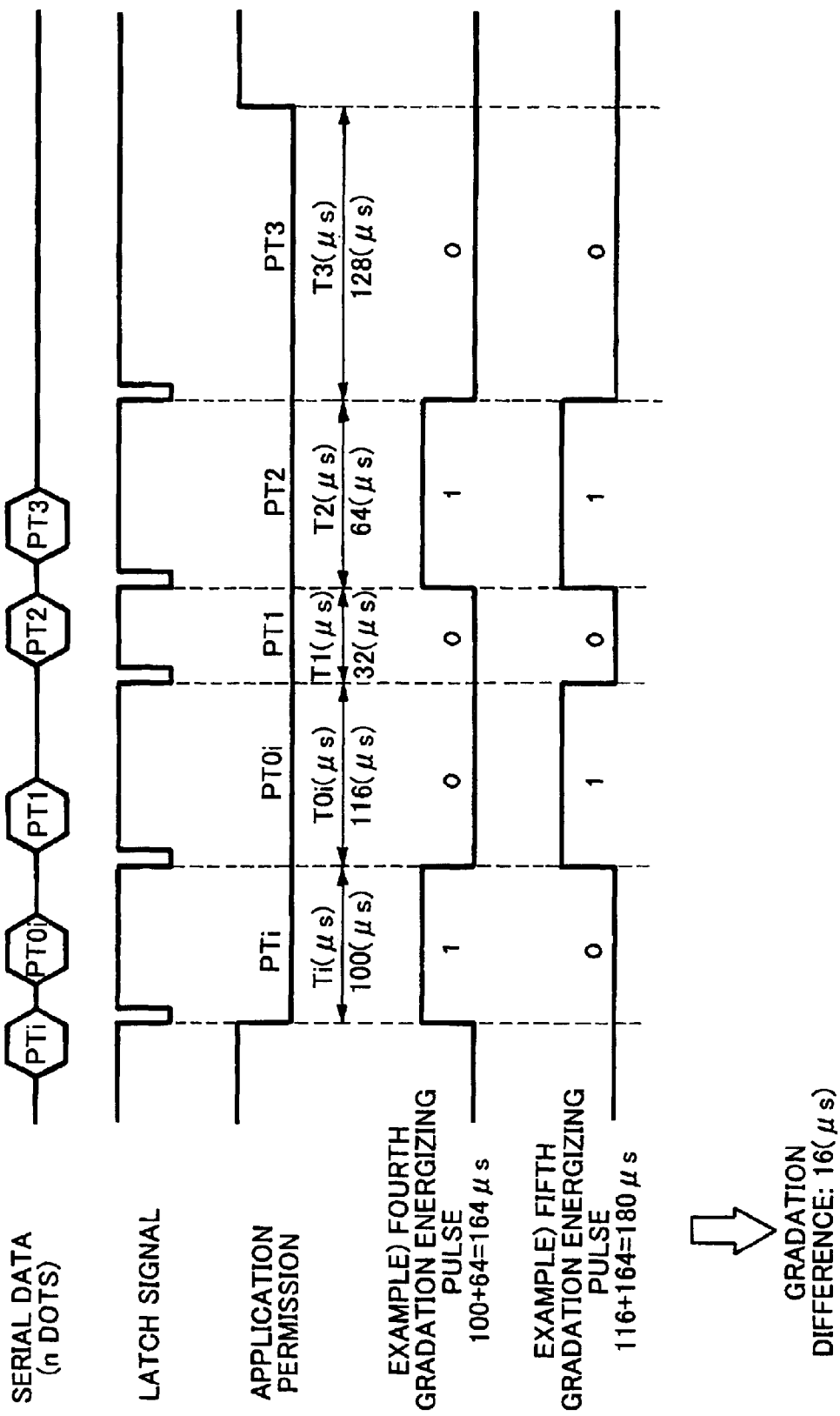
FIG. 4 is a timing chart for explaining an operation of the gradation control system according to the first embodiment of the present invention.

Specifically, when applying the respective data decomposed into the bit planes as described before, it becomes as follows. Since the value of 0100 is received as data corresponding to the fourth gradation, the decomposition into the respective bit planes is such that "0" is set in a position representing dot 1 of bit plane T3, "1" is set to bit plane T2, "0" is set to bit plane T1, "0" is set to bit plane T0$i$, and "1" is set to bit plane Ti. For example, in the first embodiment, assuming that "1" is defined as energizing data and "0" is defined as non-energizing data, bit plane T2 and bit plane Ti become energizing bit planes. Therefore, an energizing time for the fourth gradation is set to 164 μsec that is the sum of the energizing time 64 μsec for bit plane T2 and the energizing time 100 μsec for bit plane Ti. Then, for example, in case of the fifth gradation, inasmuch as bit 0 of binary data is "1", when the operation is performed in the same manner, "1" is set to only bit plane T2 and bit plane T0$i$ so that an energizing time for the fifth gradation is set to 180 μsec that is the sum of 64 μsec for bit plane T2 and 116 μsec for bit plane T0$i$. Thus, a difference between the energizing time for the fifth gradation and the energizing time for the fourth gradation becomes 16 μsec (=180 μsec−164 μsec). As understood from this example, by switching the effective bit plane between bit plane T0$i$ and bit plane Ti based on a value of binary data, the target minimum gradation difference of 16 μsec in the first embodiment can be produced. FIG. 4 shows a time chart showing this operation.

The description has been given about the structure and operation assuming that the number of gradations is 16 and the minimum gradation difference is 16 μsec in the first embodiment, but the present invention is not limited thereto.

Further, although the order of transfer to the head is shown in FIGS. 1 and 4 illustrating the first embodiment, the order of transfer is not limited thereto.

[Embodiment 2]

Figure 5:
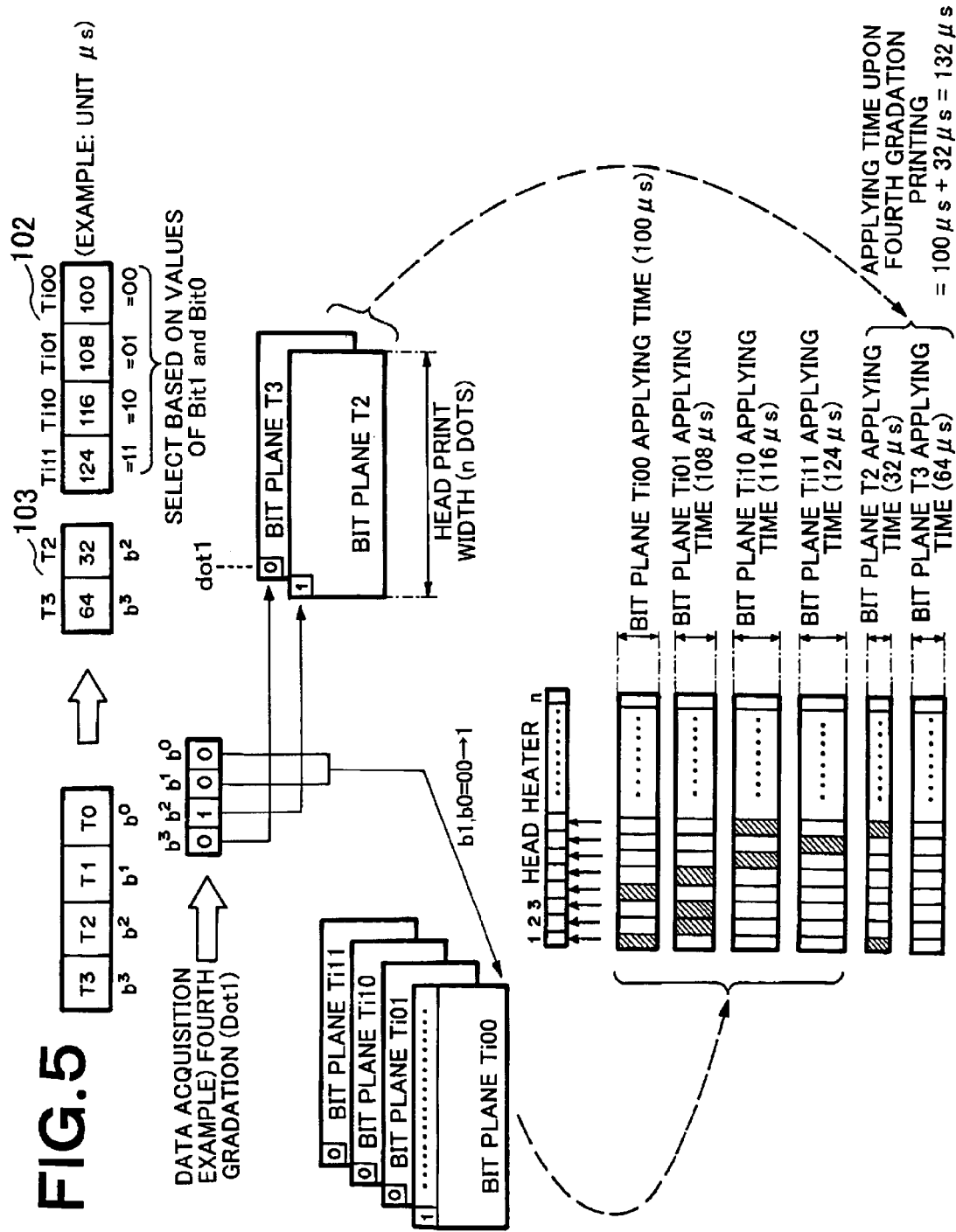
FIG. 5 is a conceptual diagram for explaining a gradation control system according to a second embodiment of the present invention.

Now, the second embodiment of the present invention will be described. FIG. 5 is a conceptual diagram when producing, for example, 16 gradations with a gradation difference of 8 μsec. Referring to FIG. 5, data of 0100 is received as fourth gradation data, a value of bit 3 is set to bit plane T3, and a value of bit 2 is set to bit plane T2, then values of bit 1 and bit 0 are checked and, depending on those values, "1" is set to one of bit planes Ti11, Ti10, Ti01 and Ti00 as represented by reference 102 in FIG. 5. In this example, inasmuch as bit 1 and bit 0 are 00, "1" is set to bit plane Ti00 while "0" is set to the other bit planes Ti11, Ti10 and Ti01. Thereafter, all the bit planes T3, T2, Ti11, Ti10, Ti01 and Ti00 are transferred to the thermal head 5 in order per dot line.

Energizing times for bit planes T3 and T2 as represented by reference 103 in FIG. 5 and bit planes Ti11, Ti10, Ti01 and Ti00 as represented by reference 102 in FIG. 5 become as follows:

| | |
|---|---|
| T3 = | 64 μsec |
| | $2^3 \times 8$ μsec |
| T2 = | 32 μsec |
| | $2^2 \times 8$ μsec |
| Ti11 = | 124 μsec |
| | $(2^1 + 2^0) \times 8$ μsec + 100 μsec |
| Ti10 = | 116 μsec |
| | $(2^1) \times 8$ μsec + 100 μsec |
| Ti01 = | 108 μsec |
| | $(2^0) \times 8$ μsec + 100 μsec |
| Ti00 = | 100 μsec |

Therefore, it is understood that an energizing time corresponding to the n-th gradation becomes 100 μsec+n×8 μsec.

By doing like the foregoing, it becomes possible to decrease a gradation difference while ensuring a sufficient energizing time in the maximum gradation value.

In the second embodiment, the four bit planes are obtained by decoding lower two bits. In view of this, in the first embodiment, the two bit planes are obtained by decoding lower one bit. Accordingly, by generalizing the first and second embodiments, $2^n$ bit planes are obtained by decoding lower n bits so that a structure and method like the first and second embodiments can be used.

[Embodiment 3]

Figure 6:
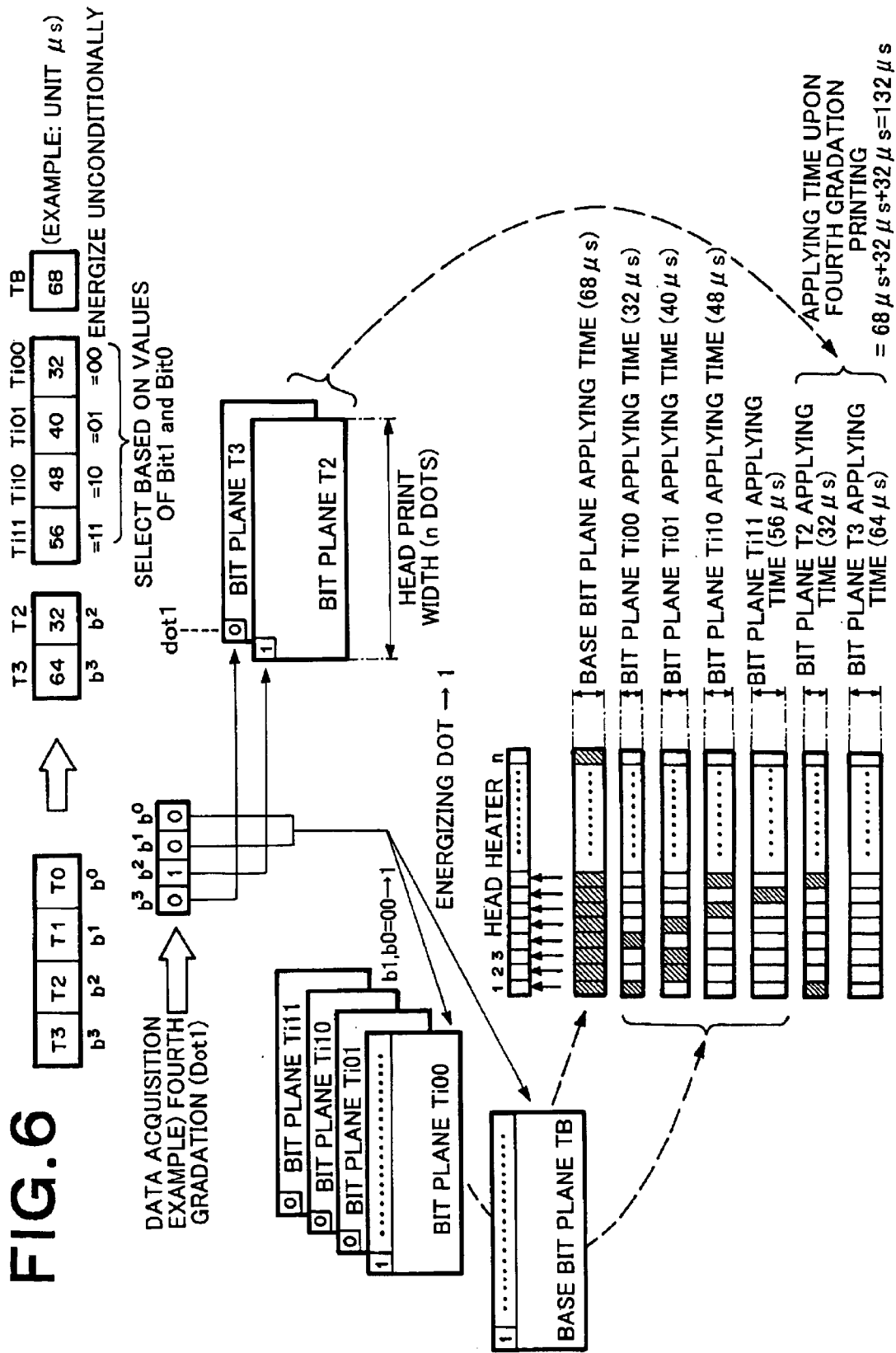
FIG. 6 is a conceptual diagram for explaining a gradation control system according to a third embodiment of the present invention.

Now, the third embodiment of the present invention will be described. FIG. 6 is a conceptual diagram when producing, for example, 16 gradations with a gradation difference of 8 μsec. For decreasing a gradation difference while ensuring a sufficient energizing time in the maximum gradation value like in the second embodiment shown in FIG. 5, the number of bit planes including the initial energizing time is increased. Because of this, there is possibility that the total time of energizing and non-energizing times of the respective bit planes (T3+T2+Ti11+Ti10+Ti01+Ti00 in the second embodiment) relative to a carrier period of one dot line is prolonged to impede realization of higher printing speed. Therefore, a physically required time that is determined based on, for example, a transfer time of the thermal head is subtracted from the minimum timer value among Ti11, Ti10, Ti01 and Ti00 including the initial energizing time. Then, a remaining time obtained by the subtraction is set as a timer value of newly provided base bit plane TB, and energization is performed unconditionally for the time of base bit plane TB, and further, such a remaining time is subtracted from bit planes Ti11, Ti10, Ti01 and Ti00. Specifically, referring to FIG. 5, the minimum value among Ti11, Ti10, Ti01 and Ti00 is 100 μsec of Ti00. Assuming that a transfer time of the thermal head 5 is 32 μsec, then 100 μsec−32 μsec=68 μsec is set as a timer value of base bit plane TB, and 32 μsec is set to Ti00. Similarly, 68 μsec is subtracted from Ti11, Ti10 and Ti01 so that Ti11=56 μsec, Ti10=48 μsec and Ti01=40 μsec.

If data to be processed is an energizing dot, "1" is unconditionally set to a corresponding dot of base bit plane TB. Then, data of all the bit planes are transferred to the thermal head in order per dot line, and energization is carried out for energizing times set for the respective dots.

By doing like the foregoing, since the total time of the whole energizing and non-energizing times can be shortened while sufficiently ensuring an energizing time in the maximum gradation value, a higher printing operation is made possible.

In the third embodiment, four bit planes are obtained by decoding lower two bits. Accordingly, by generalizing the third embodiment, $2^n$ bit planes are obtained by decoding lower n bits so that a structure and method like the third embodiment can be used.

[Embodiment 4]

Figure 7:
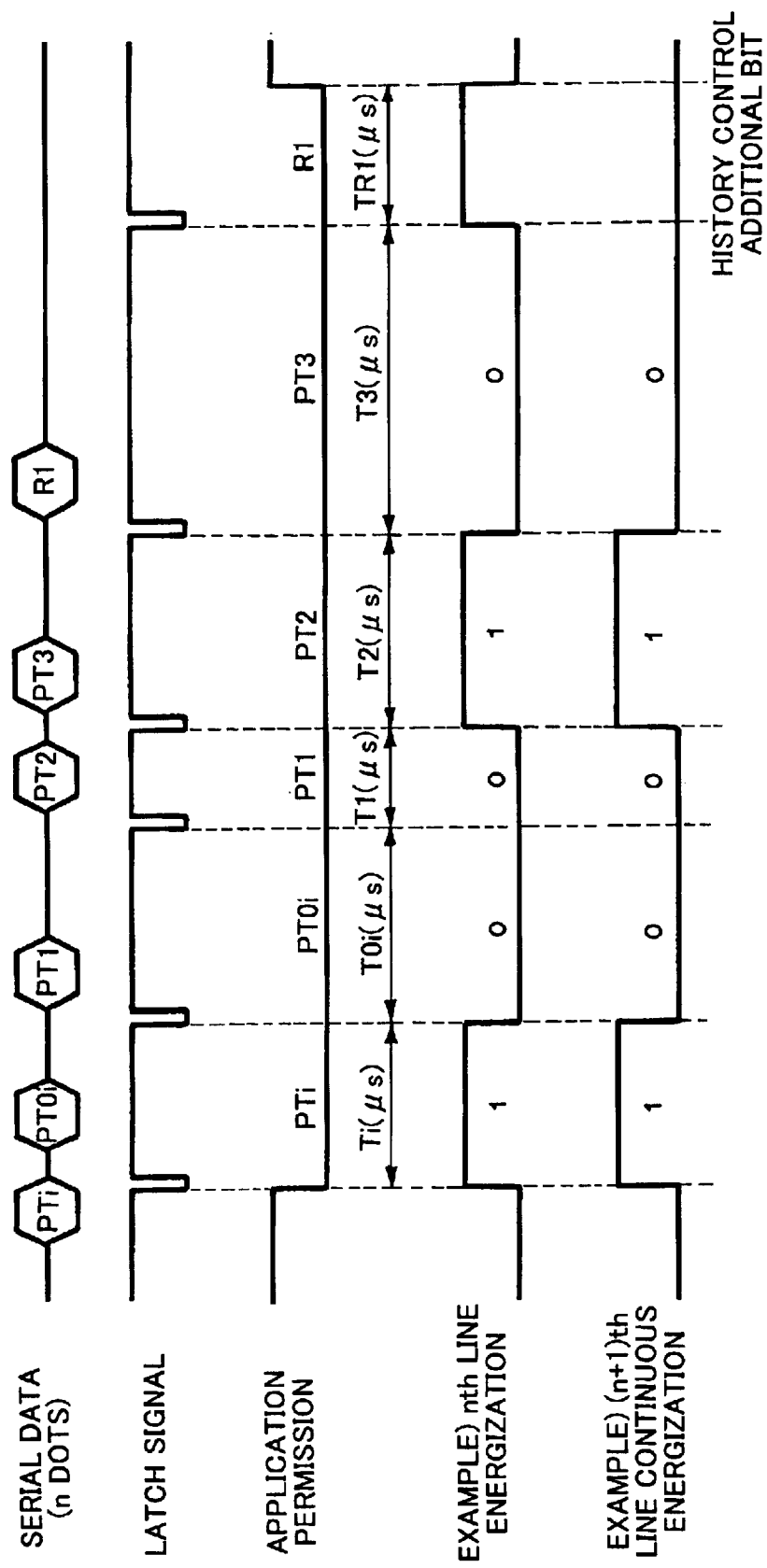
FIG. 7 is a timing chart for explaining an operation of a gradation control system according to a fourth embodiment of the present invention.
Figure 8:
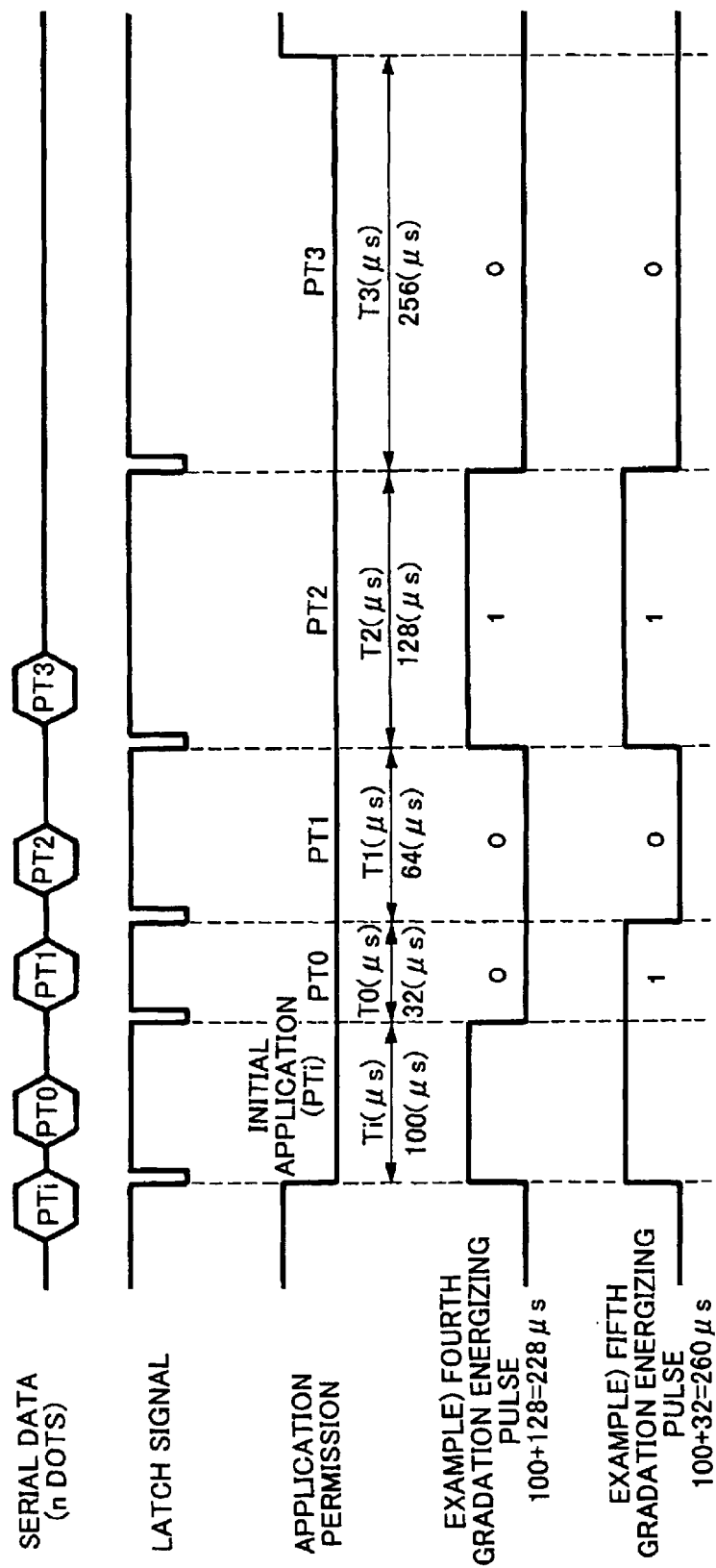
FIG. 8 is a first timing chart for explaining an operation of a conventional gradation control system.

Now, the fourth embodiment of the present invention will be described. FIG. 7 is a time chart of the fourth embodiment. Referring to FIG. 7, in addition to data transfer portions PTi, PT0i, PT1, PT2 and PT3 for implementing a gradation control of the present invention, there is a data transfer portion R1 for a thermal hysteresis control. The thermal hysteresis control is a method of referring to the past energization history to correct a heat energy amount relative to a dot to be applied, as described in Japanese Patent Application No. 2002-219830 (not yet published, filed by the same assignee). When such a control is applied to the present invention, gradation printing with high accuracy is enabled. Specifically, in FIG. 7, when paying attention to a certain dot, if no printing was carried out in the past, or when a print space relative to the previous line is so large that it is not managed as an energization history, "1" is set to history data R1 so that application is carried out by TR1 as an energizing time. Namely, judging that the thermal head is fully cooled to an initial temperature, the heat energy is superimposed by adding the time TR1 to a gradation-controlled energizing time. Then, assuming that the same dot is applied again, it can be considered that an influence of heat storage upon applying the previous line to the thermal head still remains, so that a control is performed to set "0" to history data R1, thereby not to energize the history data.

In the fourth embodiment, a control factor of the thermal history control is only one factor, i.e. only one dot is managed as a past energization history. However, by managing a plurality of dots as an energization history, further high-quality printing can be achieved.

Further, in FIG. 7 showing the operation of the fourth embodiment, the history control is executed after the gradation control portion. However, the timing of executing the history control is not limited thereto.

Further, the present invention is applicable not only to the thermal printer, but also to printers of other types and image display devices.

What is claimed is:

1. A gradation control system comprising:
    means for decoding lower n bits (n is an integer equal to 1 or greater than 1) of a binary number expressing a gradation per dot, to derive $2^n$ decoded data;
    means for grouping said $2^n$ decoded data with respect to a plurality of dots, to produce $2^n$ first bit planes;
    means for giving to an element a signal of pattern corresponding to each of said first bit planes for a time obtained by adding a time that depends on a decoded value of each of said first bit planes, to an initializing time common to all of said first bit planes;
    means for grouping, per bit weight, respective bits of said binary number excluding said lower n bits, that expresses the gradation per dot, to produce at least one second bit plane; and
    means for giving to said element a signal of pattern corresponding to each second bit plane for a time that depends on a weight of said second bit plane.

2. A gradation control system according to claim 1, wherein said initializing time is a time for causing a recording medium to reach a coloring region.

3. A gradation control system according to claim 1, wherein said initializing time is longer than a transfer time for each bit plane.

4. A gradation control system according to claim 1, further comprising means for giving to said element a signal corresponding to a history of use of each dot.

5. A thermal printer comprising the gradation control system according to claim 1.

6. A gradation control system comprising:
    means for decoding lower n bits (n is an integer equal to 1 or greater than 1) of a binary number expressing a gradation per dot, to derive $2^n$ decoded data;
    means for grouping said $2^n$ decoded data with respect to a plurality of dots, to produce $2^n$ first bit planes;
    means for giving to an element a signal of pattern corresponding to each of said first bit planes for a time obtained by subtracting an unconditional time common to all of said first bit planes from a time obtained by adding a time that depends on a decoded value of each of said first bit planes, to an initializing time common to all of said first bit planes;
    means for giving to said element a signal of all bit effective pattern for said unconditional time;
    means for grouping, per bit weight, respective bits of said binary number excluding said lower n bits, that expresses the gradation per dot, to produce at least one second bit plane; and
    means for giving to said element a signal of pattern corresponding to each second bit plane for a time that depends on a weight of said second bit plane.

7. A gradation control system according to claim 6, wherein said initializing time is a time for causing a recording medium to reach a coloring region.

8. A gradation control system according to claim 6, wherein said initializing time is longer than a transfer time for each bit plane.

9. A gradation control system according to claim 6, further comprising means for giving to said element a signal corresponding to a history of use of each dot.

10. A thermal printer comprising the gradation control system according to claim 6.

11. A gradation control method comprising the steps of:
    decoding lower n bits (n is an integer equal to 1 or greater than 1) of a binary number expressing a gradation per dot, to derive $2^n$ decoded data;
    grouping said $2^n$ decoded data with respect to a plurality of dots, to produce $2^n$ first bit planes;
    giving to an element a signal of pattern corresponding to each of said first bit planes for a time obtained by adding a time that depends on a decoded value of each of said first bit planes, to an initializing time common to all of said first bit planes;
    grouping, per bit weight, respective bits of said binary number excluding said lower n bits, that expresses the gradation per dot, to produce at least one second bit plane; and
    giving to said element a signal of pattern corresponding to each second bit plane for a time that depends on a weight of said second bit plane.

12. A gradation control method according to claim 11, wherein said initializing time is a time for causing a recording medium to reach a coloring region.

13. A gradation control method according to claim 11, wherein said initializing time is longer than a transfer time for each bit plane.

14. A gradation control method according to claim 11, further comprising a step of giving to said element a signal corresponding to a history of use of each dot.

15. A gradation control method comprising the steps of:

decoding lower n bits (n is an integer equal to 1 or greater than 1) of a binary number expressing a gradation per dot, to derive $2^n$ decoded data;

grouping said $2^n$ decoded data with respect to a plurality of dots, to produce $2^n$ first bit planes;

giving to an element a signal of pattern corresponding to each of said first bit planes for a time obtained by subtracting an unconditional time common to all of said first bit planes from a time obtained by adding a time that depends on a decoded value of each of said first bit planes, to an initializing time common to all of said first bit planes;

giving to said element a signal of all bit effective pattern for said unconditional time;

grouping, per bit weight, respective bits of said binary number excluding said lower n bits, that expresses the gradation per dot, to produce at least one second bit plane; and giving to said element a signal of pattern corresponding to each second bit plane for a time that depends on a weight of said second bit plane.

16. A gradation control method according to claim 15, wherein said initializing time is a time for causing a recording medium to reach a coloring region.

17. A gradation control method according to claim 15, wherein said initializing time is longer than a transfer time for each bit plane.

18. A gradation control method according to claim 15, further comprising a step of giving to said element a signal corresponding to a history of use of each dot.

* * * * *